(12) United States Patent
Baarda

(10) Patent No.: US 10,948,090 B2
(45) Date of Patent: Mar. 16, 2021

(54) SERVO GAS VALVE

(71) Applicant: Honeywell Technologies Sarl, Rolle (CH)

(72) Inventor: Gerrit Jan Baarda, Emmen (NL)

(73) Assignee: Honeywell Technologies Sarl, Rolle (CH)

( * ) Notice: Subject to any disclaimer, the term of this patent is extended or adjusted under 35 U.S.C. 154(b) by 73 days.

(21) Appl. No.: 15/498,132

(22) Filed: Apr. 26, 2017

(65) Prior Publication Data
US 2017/0314688 A1    Nov. 2, 2017

(30) Foreign Application Priority Data
Apr. 27, 2016  (EP) .................................. 16167277

(51) Int. Cl.
| F16K 11/044 | (2006.01) |
| F16K 1/46 | (2006.01) |
| F16K 1/36 | (2006.01) |
| F16K 31/06 | (2006.01) |

(52) U.S. Cl.
CPC .............. *F16K 11/044* (2013.01); *F16K 1/36* (2013.01); *F16K 1/46* (2013.01); *F16K 31/0627* (2013.01)

(58) Field of Classification Search
CPC ... F16K 1/36; F16K 1/44; F16K 1/443; F16K 11/048; F16K 31/0627
USPC ..................................................... 137/614.21
See application file for complete search history.

(56) References Cited

U.S. PATENT DOCUMENTS

| 3,329,165 | A | * | 7/1967 | Lang ................... | F15B 13/0405 |
| | | | | | 137/625.5 |
| 3,422,850 | A | | 1/1969 | Caldwell | |
| 4,838,519 | A | * | 6/1989 | Buffet ................. | F16K 31/0606 |
| | | | | | 137/596.17 |
| 7,409,964 | B2 | * | 8/2008 | Hoeptner, III ............ | F16K 1/04 |
| | | | | | 137/218 |

(Continued)

FOREIGN PATENT DOCUMENTS

DE    202015008485 U1    3/2016

OTHER PUBLICATIONS

The Extended European Search Report for EP Application No. 16167277.9, dated Oct. 18, 2016.

(Continued)

*Primary Examiner* — Marina A Tietjen
*Assistant Examiner* — Paul J Gray
(74) *Attorney, Agent, or Firm* — Shumaker & Sieffert, P.A.

(57) ABSTRACT

Servo gas valve comprising a gas inlet connection, a servo gas connection, a bleed gas connection, a valve body, and first and second valve seats. When a first section of the valve body is pressed against the first valve seat, the gas inlet connection is closed and the servo gas connection and the bleed gas connection are in communication with each other. When a second section of the valve body is pressed against the second valve seat, the gas inlet connection is opened and is in communication with servo gas connection while the bleed gas connection and the servo gas connection are not in communication with each other. The first section of the valve body is configured to allow for self-alignment of the first section of the valve body relative to the first valve seat when the first section of the valve body is pressed against the first valve seat.

16 Claims, 3 Drawing Sheets

(56) References Cited

U.S. PATENT DOCUMENTS

2008/0042090 A1    2/2008  Zweber
2014/0264134 A1*   9/2014  Butler .................... F16K 1/385
                                                           251/357

OTHER PUBLICATIONS

Honeywell B.V., "CVI Integrated Gas Control Safety System," 8 pages, downloaded Apr. 11, 2017.
Response to Extended Search Report dated Oct. 18, 2016, from counterpart European Application No. 16167277.9, filed Apr. 20, 2018, 17 pp.
Text Intended to Grant from counterpart European Application No. 16167277.9, dated Jun. 29, 2018, 41 pp.

\* cited by examiner

SERVO GAS VALVE

This application claims priority to European Patent Application Serial No. 16 167 277.9, filed Apr. 27, 2016, which is incorporated herein by reference.

TECHNICAL FIELD

The present patent application relates to a servo gas valve for a gas control device and to a gas control device.

BACKGROUND

The product leaflet "CVI Integrated Gas Control Safety System, Honeywell B.V., EN4R-0724 9503 RO-NL" discloses a gas control device comprising a safety gas valve, a servo gas valve, a servo gas pressure regulator and a main gas valve. The servo gas valve is used to operate the main gas valve and is also often called an operator valve. The servo gas valve disclosed by the above product leaflet comprises a gas inlet connection, a servo gas connection, and a bleed gas connection. Said servo gas valve comprises further a valve body and first and second valve seats acting together with the valve body. In a first position of the valve body, when a first section of the valve body is pressed against the first valve seat, the gas inlet connection is closed and the servo gas connection and the bleed gas connection are in communication with each other. In a second position of the valve body, when a second section of the valve body is pressed against the second valve seat, the gas inlet connection is opened and is in communication with the servo gas connection while the bleed gas connection and the servo gas connection are not in communication with each other.

Said servo gas valve comprises further a valve stem and a separate valve plunger. The valve stem is carrying the valve body, wherein the valve stem is moveable in a linear direction to allow a movement of the valve body relative to the valve seats. A first spring acts on that valve stem. Said first spring presses the valve stem against the valve plunger and tends to lift up the first section of the valve body from the first valve seat.

The separate valve plunger acts together with an actuator provided by an operator coil and with a second spring. The second spring presses the valve plunger against the valve stem and tends to press the first section of the valve body against the first valve seat. The first spring and the second spring are construed in such a manner that when the actuator is deactivated or not energized, the first section of valve body is pressed against the first valve seat closing the gas inlet connection of the servo gas valve. However, when the actuator is activated or energized, the actuator moves the valve plunger in a linear direction against the spring force of second spring thereby allowing the valve body to open the gas inlet connection of the servo gas valve.

As mentioned above, in the prior art servo gas valve the valve stem and the valve plunger are separate elements each of them acting together with a spring. Facing ends of the valve stem and the valve plunger are pressed against each other by the springs providing a pivot between the facing ends of valve stem and valve plunger. This allows a self-alignment between the valve stem and the valve plunger to compensate any misalignments within the gas valve. This is of importance to securely close the gas inlet connection when the actuator is deactivated or not energized and when the valve body, namely the first section of the same, is pressed against the first valve seat.

SUMMARY

Against this background, a novel servo gas valve according to claim 1 is provided. According to the present invention, the valve stem provides as an integral part of the valve plunger. So, the valve stem and the valve plunger are no longer separate elements but provided as one single element. The valve plunger acts together with the actuator in such a way that when the actuator is activated or energized, the valve stem that provides as integral part the valve plunger presses the second section of the valve body against the second valve seat, while when the actuator is deactivated or not energized, the valve stem that provides as integral part the valve plunger presses the first section of the valve body against the first valve seat.

The first section of the valve body and the valve stem allow a self-alignment of the first section of the valve body relative to the first valve seat when the first section of the valve body is pressed against the first valve seat. Specifically, the self-alignment allows the compensation of misalignments between the axis of the valve stem and the axis of the first valve seat, especially when the valve stem is crooked relative to the first valve seat.

The servo gas valve according to the invention has a more simple design compared to the prior art servo gas valve. Due to the fact that the valve stem and the valve plunger are no longer separate elements but provided as one single element, the first spring of the prior art servo gas valve is eliminated. So, at least two elements can be saved compared to the prior art servo gas valve, namely the first spring and the separate valve plunger.

The self-alignment function to compensate any misalignments of the servo gas valve is provided by the first section of the valve body together with the valve stem. So, the function of the pivot of the prior art safety gas valve is in the servo gas valve of the present invention and provided by the valve body. This allows a secure closing of the gas inlet connection when the actuator is deactivated or not energized and when the valve body, namely the first section of the same, is pressed against the first valve seat. Specifically, the self-alignment allows the compensation of misalignments between the axis of the valve stem and the axis of the first valve seat, especially when the valve stem is crooked relative to the first valve seat.

According to a preferred embodiment of the invention, the first section of the valve body has at least partially over a width of the same a thickness of equal or less than 0.5 mm. This allows a reliable deformation of the first section of the valve body when the same is pressed against the first valve seat to provide the self-alignment of the first section of the valve body relative to the first valve seat when the first section of the valve body is pressed against the first valve seat.

According to a preferred embodiment of the invention, the first section of the valve body has a width being at least 2-times the width of the opening of the gas inlet connection. This allows a reliable deformation of the first section of valve body when the same is pressed against the first valve seat to provide the self-alignment of the first section of the valve body relative to the first valve seat when the first section of the valve body is pressed against the first valve seat.

According to a preferred embodiment of the invention, the valve stem that provides as integral part the valve plunger comprises a recess defining together with the first section of the valve body a hollow space. This allows a reliable deformation of the first section of valve body when the same is pressed against the first valve seat to provide the self-alignment of the first section of the valve body relative to the first valve seat when the first section of the valve body is pressed against the first valve seat.

The gas control device is defined in claim 11.

BRIEF DESCRIPTION OF THE DRAWINGS

Preferred developments of the invention are provided by the dependent claims and the description which follows. Exemplary embodiments are explained in more detail on the basis of the drawing, in which:

DESCRIPTION

Figure 1:
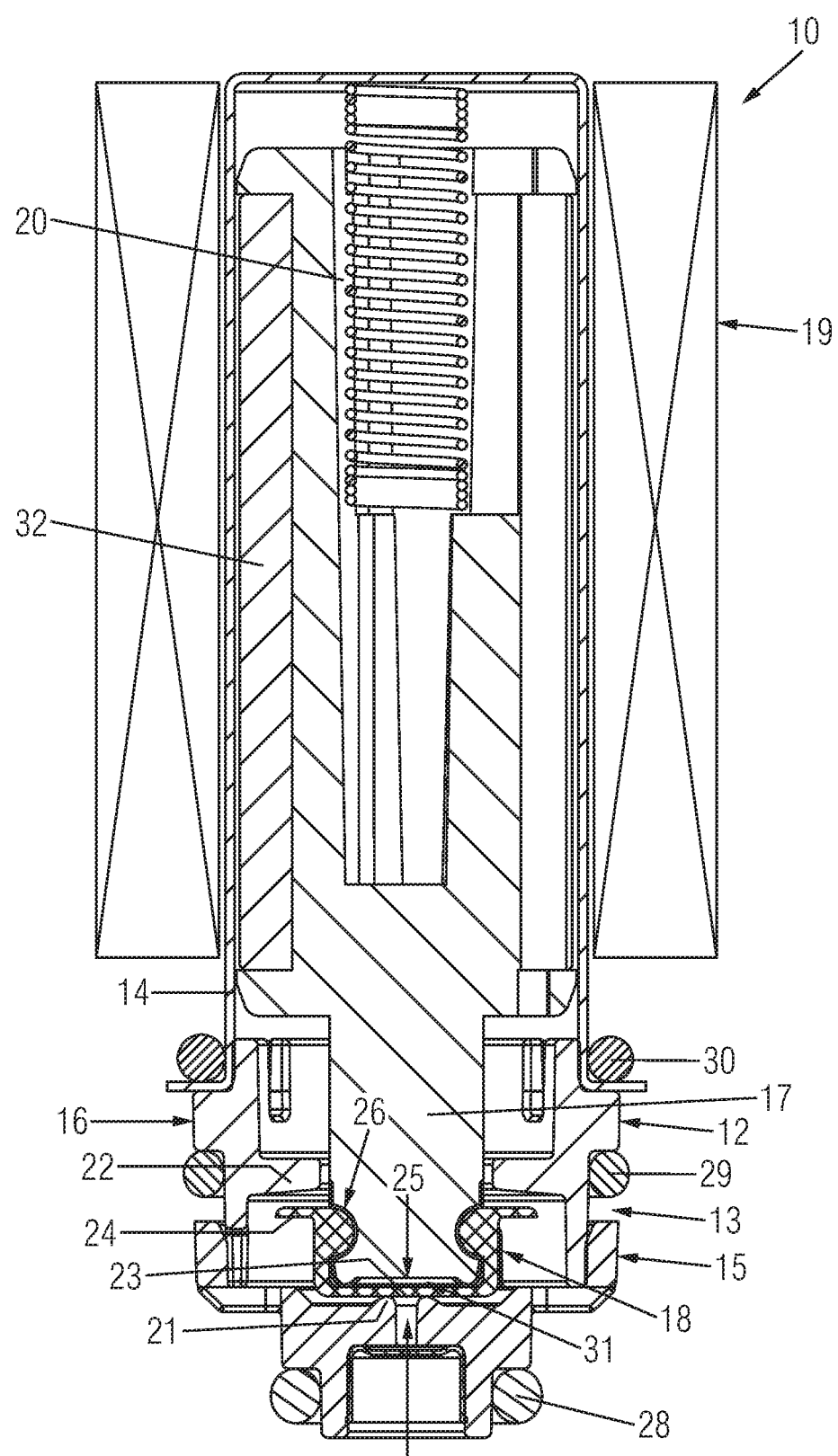
FIG. 1 shows a cross section through a servo gas valve.
Figure 2:
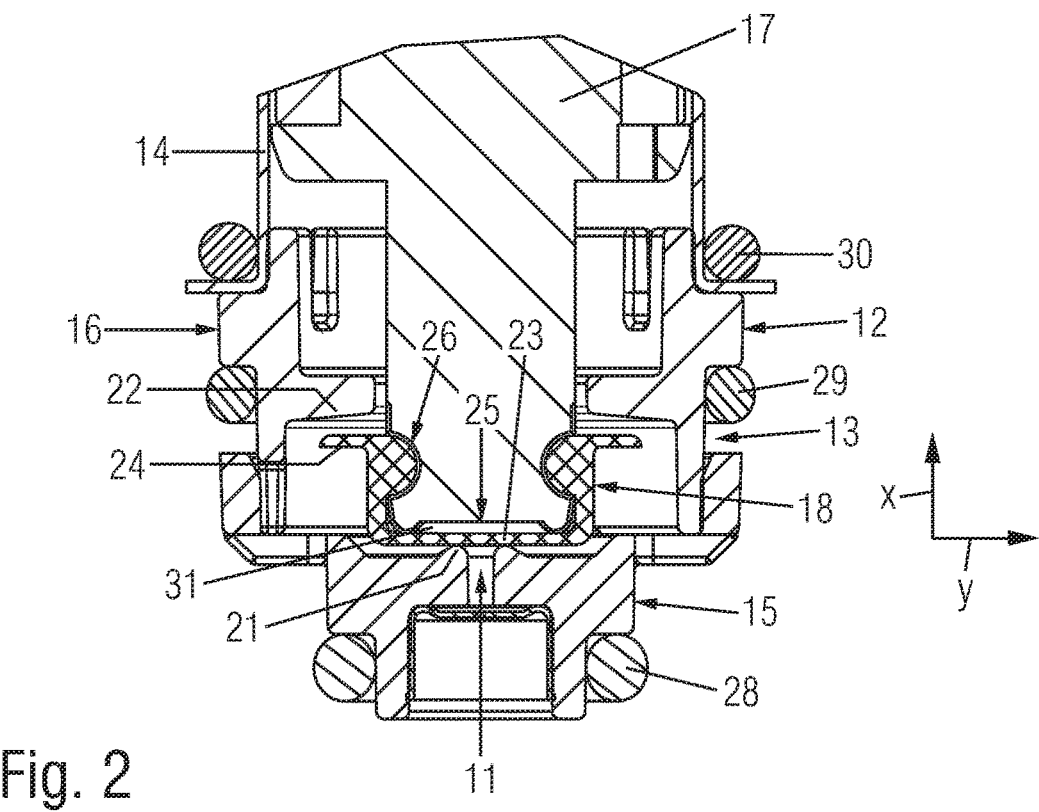
FIG. 2 shows a cross section through a detail of the servo gas valve in a first status of the same.
Figure 3:
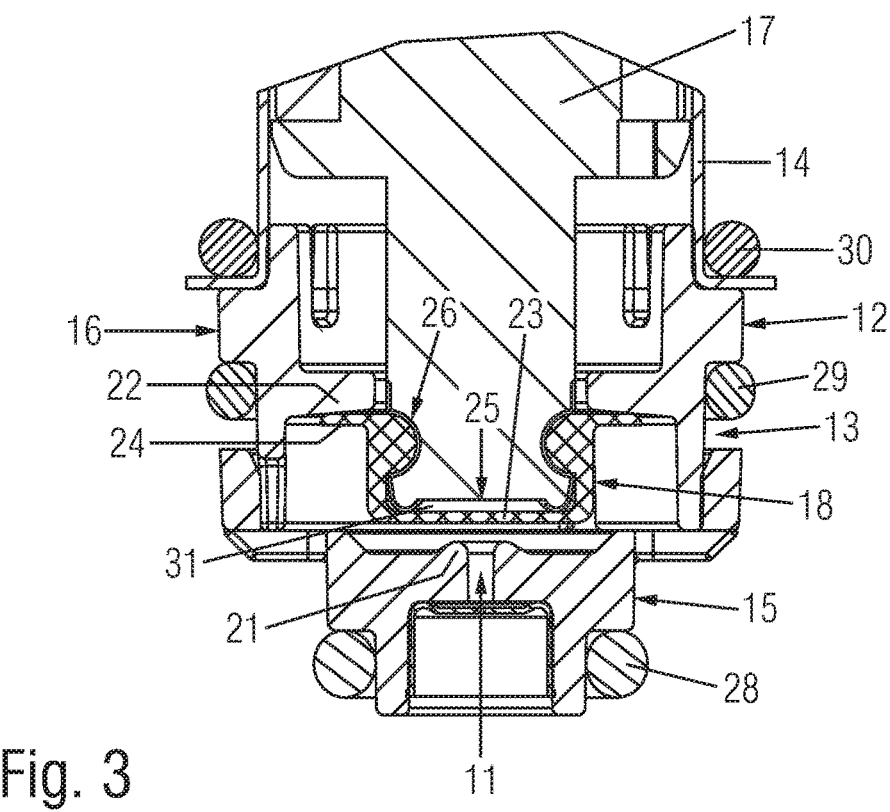
FIG. 3 shows a cross section through the detail of FIG. 2 in a second status of the same.

FIGS. 1 to 3 show details of a preferred embodiment of a servo gas valve 10 according the present invention.

The servo gas valve 10 comprises a gas inlet 11 connection, a servo gas connection 13 and a bleed gas connection 12. The gas inlet connection 11 is preferably provided by a valve section 15 of the servo gas valve 10 also often called bottom seat section. The servo gas connection 13 and the bleed gas connection 12 are preferably provided by valve section 16 of the servo gas valve 10 also often called top seat section.

The servo gas valve 10 further comprises a valve stem 17 and a valve body 18 carried by the valve stem 17.

The servo gas valve 10 further comprises a first valve seat 21 and a second valve seat 22 acting together with the valve body 18.

In a first position of the valve body 18, when a first section 23 of the valve body 18 is pressed against the first valve seat 21, the gas inlet connection 11 is closed and the servo gas connection 13 and the bleed gas connection 12 are in communication with each other. The first valve seat 21 is preferably provided by the valve section 15 also often called the bottom seat section (see FIG. 2).

In a second position of the valve body 18, when a second section 24 of the valve body 18 is pressed against the second valve seat 22, the gas inlet connection 11 is opened and is in communication with servo gas connection 13 while the bleed gas connection 12 and the servo gas connection 13 are not in communication with each other. The second valve seat 22 is preferably provided by the valve section 16 also often called the top seat section (see FIG. 3).

The valve stem 17 carries the valve body 18. The valve stem 17 is moveable in a linear direction relative to the valve sections 15, 16 to allow a movement of the valve body 18 relative to the valve seats 21, 22.

The valve stem 17 provides as an integral part of the valve stem 17 a valve plunger. The valve stem and the valve plunger are provided as one single element 17. The valve plunger being an integral part of the valve stem 17 acts together with an actuator 19 preferably provided by an operator coil. The actuator 19 (see FIG. 1) is positioned around a valve section 14 of the servo gas valve accommodating the valve stem 17, especially the valve plunger being an integral element of the valve stem 17. When the actuator 19 is activated or energized, the valve stem 17 that provides as integral part the valve plunger presses the second section 24 of the valve body 18 against the second valve seat 22 (see FIG. 3).

In the shown embodiment, the valve stem 17 that provides as integral part the valve plunger is made from a plastic material having embedded a metal element acting together with the actuator 19. It is also possible that the valve stem 17 that provides as integral part the valve plunger is made completely from a metal material.

When the actuator 19 is deactivated or not energized, the valve stem 17 that provides as integral part the valve plunger presses the first section 23 of the valve body 18 against the first valve seat 21 (see FIG. 2). This is provided by spring 20 acting on the valve stem 17. The force provided by said spring 20 tends to press the valve stem 17 that provides as integral part the valve plunger and thereby the first section 23 of the valve body 18 against the first valve seat 21. When the actuator 19 is activated or energized, the valve stem 17 that provides as integral part the valve plunger is moved and the first section 23 of the valve body is lifted up from the first valve seat 21 against the force provided by the spring 20.

The first section 23 of the valve body 18 and the valve stem 17 allow a self-alignment of the first section 23 of the valve body 18 relative to the first valve seat 21 when the first section 23 of the valve body 28 is pressed against the first valve seat 21.

The self-alignment function that allows the compensation of any misalignments of the servo gas valve 10 is provided by the first section 23 of the valve body 18 together with the valve stem 17.

Specifically, the self-alignment allows the compensation of misalignments between the axis of the valve stem 17 and the axis of the first valve seat 21, especially when the valve stem 17 is crooked relative to the first valve seat 21.

Further details of the servo gas valve 10 providing said self-alignment function in a reliable and easy manner are described below.

The first section 23 of the valve body 18 is relatively thin, meaning that the same has a thickness (seen in direction X of FIG. 2 running parallel to the moving direction of the valve stem 17) of equal or less than 0.5 mm. Preferably, the first section 23 of the valve body 18 has a thickness between 0.1 mm and 0.5 mm.

The first section 23 of the valve body 18 is considerably larger than the first valve seat 21, meaning that the same has a width (seen in direction Y of FIG. 2 running perpendicular to the moving direction of the valve stem 17) being at least 2-times, preferably at least 3-times, most preferably at least 4-times, the width of the opening of the gas inlet connection 11.

The width of the opening of the gas inlet connection 11 is defined by the diameter of the first valve seat 21. The diameter of the first section 23 of the valve body 18 is at least 2-times, preferably at least 3-times, most preferably at least 4-times, the diameter of the first valve seat 21.

The valve stem 17 that provides as integral part the valve plunger comprises a recess 25 defining together with the first section 23 of the valve body 18 a hollow space 31.

Preferably, the combination of the features that the first section 23 of the valve body 18 is relatively thin, and that first section 23 of the valve body 18 is considerably larger than the first valve seat 21, and that the valve stem 17 comprises the recess 25 defining together with the first section 23 of the valve body 18 a hollow space 31, allows to provide the self-alignment of the first section 23 of the valve body 18 relative to the first valve seat 21 when the first section 23 of the valve body 28 is pressed against the first valve seat 21 is a very reliable and therefore favourable manner.

The self-alignment of the first section 23 of the valve body 18 relative to the first valve seat 21 when the first section 23 of the valve body 28 is pressed against the first valve seat 21 can be further improved by vent channels 26 of the valve stem 17 allowing to vent the hollow space 31 through the or each vent channel 26.

The valve body 18 is made from a rubber or rubber-like material and is provided by a hat-like element having an inner cap-like section and an outer brim-like section.

The first section 23 of the valve body 18 acting together with the first valve seat 21 is provided by the inner cap-like section. The second section 24 of the valve body 18 acting together with the second valve seat 22 is provided by the outer brim-like section.

The servo gas valve 10 shown in FIGS. 1 to 3 is preferably accommodated by a housing of a gas control device using said servo gas valve 10. FIGS. 1 to 3 show sealing elements 28, 29, 30 for sealing the servo gas valve 10 relative the housing of the gas control device. However, FIGS. 1 to 3 do not show the housing of the gas control device.

Figure 4:
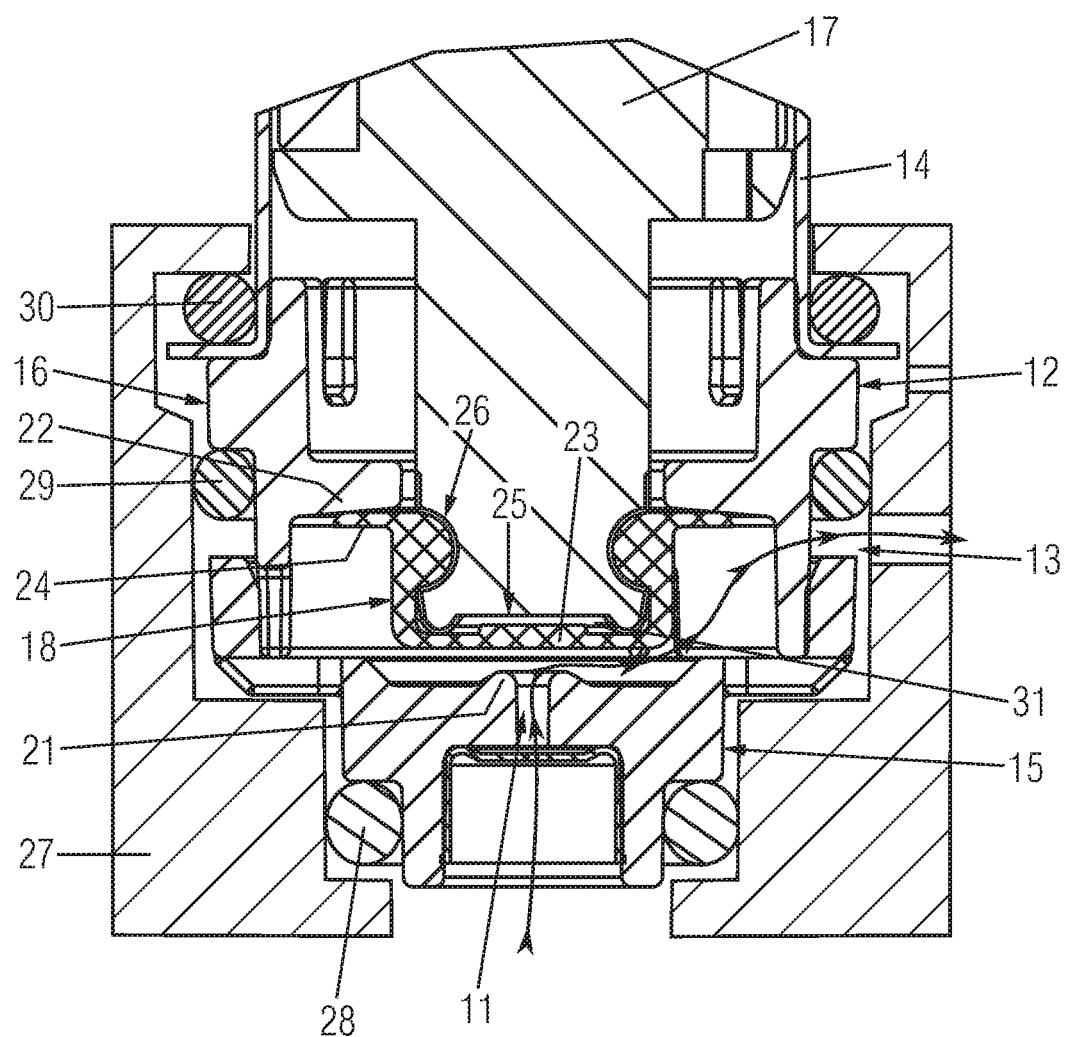
FIG. 4 shows the detail of FIG. 3 together with the gas control device housing accommodating the servo gas valve cut having an alternative valve body.

FIG. 4 shows a detail of a servo gas valve 10 accommodated by a housing 27 of a gas control device. As can be seen in FIG. 4, the sealing element 28 seals the valve section 15 relative to the housing 27, and the sealing element 29 seals the valve section 17 relative to the housing 27, and sealing element 30 seals the valve section 1145 relative to the housing 27.

The valve body 18 of the embodiment shown in FIG. 4 differs from the valve body 18 shown in FIGS. 1 to 3. In FIGS. 1 to 3, the first section 23 of the valve body 18 acting together with the first valve seat 21 comprises over the entire width of the same a uniform thickness. In FIG. 4 the thickness of the first section 23 of the valve body 18 changes over width of the same. In FIG. 4 the first section 23 of the valve body 18 has at least partially over the width of the same a thickness of equal or less than 0.5 mm.

As can be seen in the Figures, the first valve seat 21 surrounding the gas inlet connection 11 is provided by a bulge-like or torus-like section of the valve section 15.

The recess 25 of the valve stem 17 is provided by a bulge-like or torus-like section of the valve stem 17.

In FIG. 4, the thickness of the first section 23 of the valve body 18 is in a radial inner section of the same larger than in a radial outer section of the same. Said radial inner section of the first section 23 of the valve body 18 contacts the first valve seat 21 of the servo gas valve when the valve body 18 is pressed in the direction toward the first valve seat. Said radial outer section of the first section 23 of the valve body 18 being thinner than said radial inner section of the first section 23 of the valve body 18 contacts the bulge-like or torus-like section of the valve stem 17 that surrounds the recess 25. At least said radial outer section of the first section 23 of the valve body 18 has a thickness of equal or less than 0.5 mm.

The servo gas valve 10 allows to reliable close the gas inlet connection 11 when the actuator 19 is deactivated or not energized. This is possible although the valve stem 17 provides as integral part the valve plunger. Even if the spring force provided by the spring 20 is relatively small, the gas inlet connection 11 can be reliably closed. This is provided by the feature the first section 23 of the valve body 18 and the valve stem 17 allow a self-alignment of the first section 23 of the valve body 18 relative to the first valve seat 21 when the first section 23 of the valve body 28 is pressed against the first valve seat 21. Using a spring 20 with relatively small spring force is of advantage to reduce then opening force to be provided by the actuator when opening the gas inlet connection 11.

The invention also relates to gas control device comprising a safety gas valve, a servo gas valve, a servo gas pressure regulator and a main gas valve. The function and relationship of these four elements of a gas control device is well known to the person skilled in the art. All four elements are accommodated by the housing 27 of a gas control device.

When the safety gas valve is opened, gas can flow through the gas control device. When the safety gas valve is closed, the gas flow through the gas control device is stopped.

The main gas valve controls the gas flow though the gas control device when the safety gas valve is opened. The main gas valve is operated on basis of a servo gas pressure provided by the servo gas valve 10 and the servo pressure regulator.

A gas control device according to the present invention comprises a servo gas valve 10 as described above.

LIST OF REFERENCE SIGNS 10 servo gas valve
11 gas inlet connection
12 bleed gas connection
13 servo gas connection
14 valve section
15 valve section
16 valve section
17 valve stem/valve plunger
18 valve body
19 actuator
20 spring
21 first valve seat
22 second valve seat
23 first section of valve body
24 second section of valve body
25 recess
26 vent channel
27 gas control device housing
28 sealing element
29 sealing element
30 sealing element
31 hollow space
32 element

What is claimed is:

1. A servo gas valve for a gas control device, comprising:
a gas inlet connection;
a servo gas connection;
a bleed gas connection;
a valve body;
first and second valve seats acting together with the valve body in such a way that in a first position of the valve body, when a first section of the valve body is pressed against the first valve seat, the gas inlet connection is closed and the servo gas connection and the bleed gas connection are in communication with each other, while in a second position of the valve body, when a second section of the valve body is pressed against the second valve seat, the gas inlet connection is opened and is in communication with the servo gas connection while the bleed gas connection and the servo gas connection are not in communication with each other; and a valve stem carrying the valve body, wherein the valve stem is moveable in a linear direction to allow a movement of the valve body relative to the first and second valve seats, wherein the valve stem includes a valve plunger, the valve plunger acting together with an actuator in such a way that when the actuator is activated or energized, the valve stem that includes the valve plunger presses the second section of the valve body against the second valve seat, while when the actuator is deactivated or not energized, the valve stem that includes the valve plunger presses the first section of the valve body against the first valve seat, wherein the valve stem further includes a bulge section defining a recess that defines a hollow space between the valve stem and the first section of the valve body, wherein the first section of the valve body is configured to deform into the hollow space when the first section of the valve body is pressed against the first valve seat to allow a self-alignment of the first section of the valve body relative to the first valve seat, and wherein the valve body is provided by a hat shaped element having an inner cap shaped section and an outer brim shaped section, wherein the first section of the valve body acting together with the first valve seat is provided by the inner cap shaped section, and wherein the second section of the valve body acting together with the second valve seat is provided by the outer brim shaped section.

2. The servo gas valve of claim 1, wherein the first section of the valve body has a thickness of 0.5 mm or less over at least part of a width of the first section.

3. The servo gas valve of claim 2, wherein the first section of the valve body has a thickness of between 0.1 mm and 0.5 mm over at least part of the width of the first section.

4. The servo gas valve of claim 1, wherein the first section of the valve body has a width that is at least two times a width of an opening of the gas inlet connection.

5. The servo gas valve of claim 4, wherein the width of the opening of the gas inlet connection is defined by a diameter of the first valve seat, wherein a diameter of the first section of the valve body is at least two times the diameter of the first valve seat.

6. The servo gas valve of claim 1, wherein the valve stem that includes the valve plunger comprises at least one vent channel configured to vent the hollow space when the first section of the valve body deforms into the hollow space.

7. The servo gas valve of claim 1, wherein the valve body comprises a polymetric material.

8. The servo gas valve of claim 1, wherein the valve body comprises an elastomeric material.

9. The servo gas valve of claim 1, wherein the valve body comprises rubber.

10. The servo gas valve of claim 1, further comprising a spring which biases the valve stem that includes the valve plunger and thereby the first section of the valve body against the first valve seat.

11. A servo gas valve for a gas control device, comprising:
a gas inlet connection;
a servo gas connection;
a bleed gas connection;
a valve body;
first and second valve seats acting together with the valve body in such a way that in a first position of the valve body, when a first section of the valve body is pressed against the first valve seat, the gas inlet connection is closed and the servo gas connection and the bleed gas connection are in communication with each other, while in a second position of the valve body, when a second section of the valve body is pressed against the second valve seat, the gas inlet connection is opened and is in communication with the servo gas connection while the bleed gas connection and the servo gas connection are not in communication with each other; and
a valve stem carrying the valve body, wherein the valve stem is moveable in a linear direction to allow a movement of the valve body relative to the first and second valve seats;
wherein the valve stem in a first position presses the second section of the valve body against the second valve seat, and the valve stem in a second position presses the first section of the valve body against the first valve seat;
wherein at least part of the first section of the valve body that faces the first valve seat has a thickness of 0.5 mm or less,
wherein the valve stem includes a bulge section defining a recess that defines a hollow space between the valve stem and at least part of the first section of the valve body,
wherein the first section of the valve body is configured to deform into the hollow space when the first section of the valve body is pressed against the first valve seat to allow a self-alignment of the first section of the valve body relative to the first valve seat;
wherein the at least part of the first section of the valve body that faces the first valve seat and has a thickness of 0.5 mm or less is at least two times a width of the first valve seat.

12. The servo gas valve of claim 11, wherein the valve stem further defines at least one vent channel configured to vent the hollow space when the first section of the valve body deforms into the hollow space.

13. The servo gas valve of claim 11, wherein the at least part of the first section of the valve body that faces the first valve seat and has a thickness of 0.5 mm or less comprises a polymetric material.

14. The servo gas valve of claim 11, wherein the at least part of the first section of the valve body that faces the first valve seat and has a thickness of 0.5 mm or less comprises an elastomeric material.

15. The servo gas valve of claim 11, wherein the at least part of the first section of the valve body that faces the first valve seat and has a thickness of 0.5 mm or less comprises rubber.

16. The servo gas valve of claim 11, wherein at least a part of the first section of the valve body that faces the first valve seat has a thickness between 0.1 mm and 0.5 mm.

\* \* \* \* \*

UNITED STATES PATENT AND TRADEMARK OFFICE
CERTIFICATE OF CORRECTION

PATENT NO. : 10,948,090 B2
APPLICATION NO. : 15/498132
DATED : March 16, 2021
INVENTOR(S) : Baarda It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 217 days.

Signed and Sealed this
Fourteenth Day of February, 2023

Katherine Kelly Vidal
*Director of the United States Patent and Trademark Office*